Oct. 26, 1965  M. ABEL  3,213,678
STRAIN GAUGE
Filed March 13, 1963  2 Sheets-Sheet 1
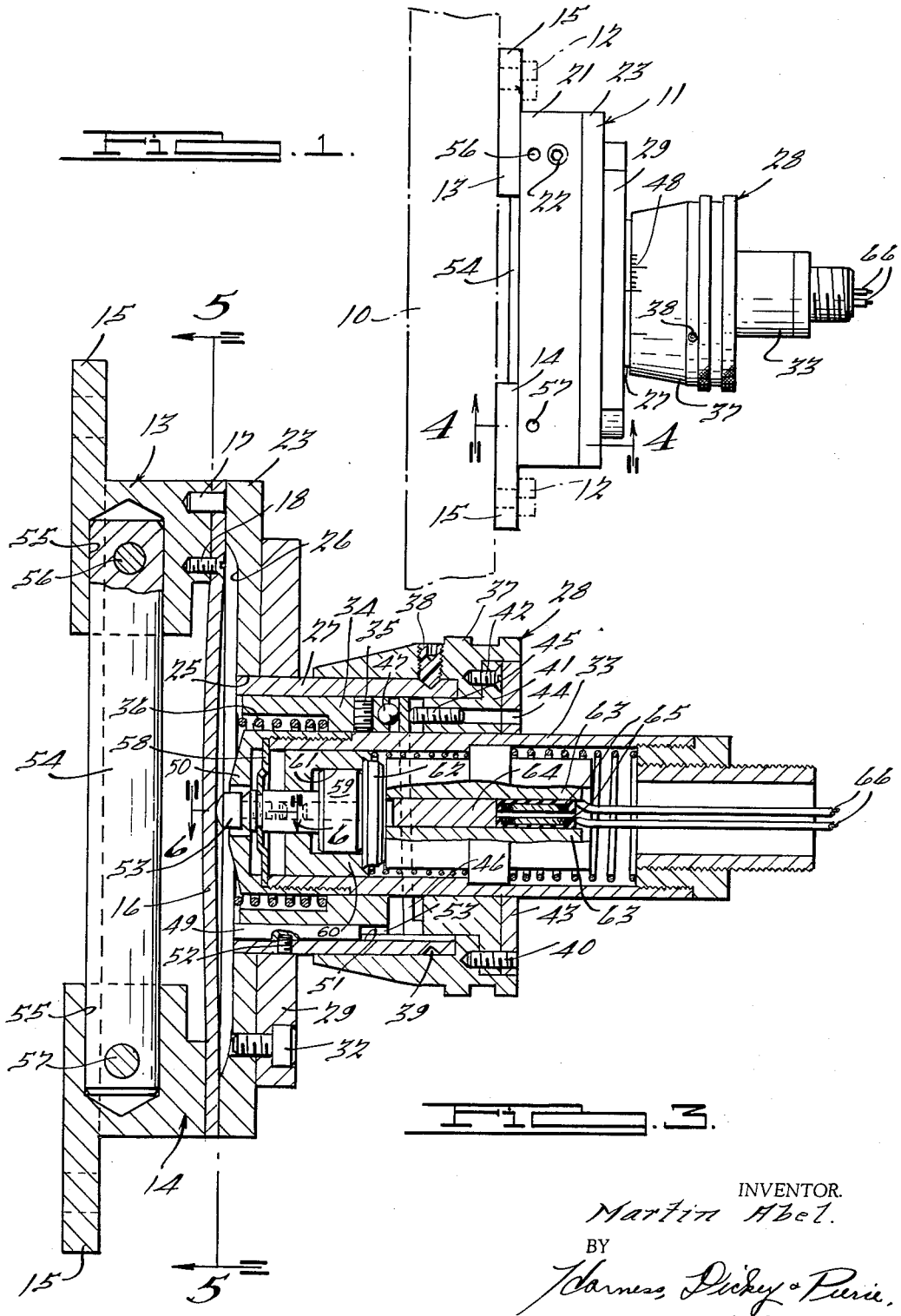
INVENTOR.
Martin Abel.
BY
Harness, Dickey & Pierce,
ATTORNEYS.

Oct. 26, 1965
M. ABEL
3,213,678
STRAIN GAUGE
Filed March 13, 1963
2 Sheets-Sheet 2
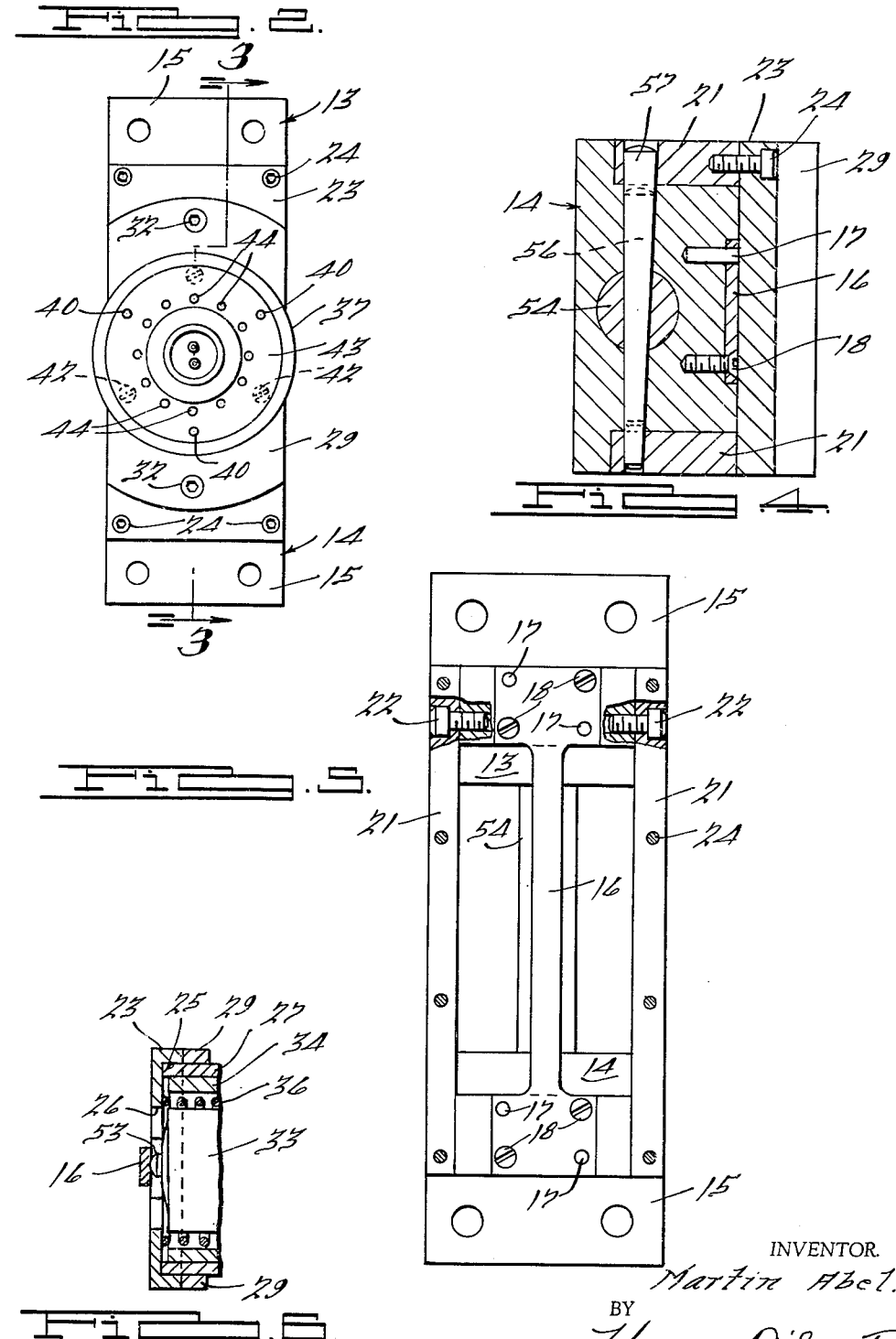
INVENTOR.
Martin Abel.
BY
Harness, Dickey & Pierce
ATTORNEYS.

United States Patent Office 3,213,678
Patented Oct. 26, 1965

3,213,678
STRAIN GAUGE
Martin Abel, Oak Park, Mich., assignor to
Force Controls Company
Filed Mar. 13, 1963, Ser. No. 264,973
12 Claims. (Cl. 73—88)

This invention relates to strain sensing devices and particularly to a sensing device that accurately measures the stress in an element over a short span of material thereof.

The strain sensing device of the present invention embodies a pair of brackets which are accurately secured to a column or other element, the stress of which is to be accurately measured when under load. The brackets are temporarily maintained in predetermined spaced relation by an interconnecting rod maintained in position by a pair of tapered pins which pass through the brackets and the shaft ends. The bracket has a bowed spring element fixed at each end thereto and bowed relative to an indicating device which is supported adajcent thereto on one of the brackets. The support is such that the brackets may move one relative to the other without being hindered by the support for the indicating device. The brackets, after being secured in fixed position to a column or other element across a space where the stress is to be gauged, have one of the dowel pins knocked therefrom to have them movable independent of each other. The spring element has a predetermined bow set therein and engaged by the actuating element of the sensing device so that any change in the bow either by a tension or compression force on the column will provide an indication of the degree of change in the material across which the gauge is mounted. While any kind of a sensing device having a dial face or other responsive means may be employed, the one herein illustrated and described, by way of example rather than limitation, is that illustrated and described in the copending application of Martin L. Abel, et al., Serial No. 177,597 now U.S. Patent No. 3,132,268, filed March 5, 1962, for Transducer, and assigned to the assignee of the present invention.

After a predetermined load is applied to the material across which the brackets are mounted, the bow spring element will have changed its degree of bowing sufficiently to actuate the engaged element of the indicating device to have it move an amount which permits the magnetic force of the device to draw the armature into bridging position with a pair of pole pieces of a magnet which induces a flux in a pair of coils on the pole pieces. The flux produces an electro motive force in a circuit containing the coils which provides the indication to appraise the operator that the column or other element has been strained to a predetermined load over the distance which was spanned by the brackets of the gauge. By moving the indicating device inwardly and outwardly relative to the bowed spring element, the amount of strain load which must be present to produce an indication may be varied for the same column or for different columns or elements, as the case may be.

Accordingly, the main objects of the invention are: to provide a strain sensing device which is extremely accurate over a small span of material to be gauged; to have a predetermined bow set on a spring element of a sensing device which is maintained after the sensing device has been permanently fixed across the material to be gauged and the retaining element is released so that the change in the spacing of the supporting elements of the device is multiplied by the change in the bow of the bowable element; to support an indicating element on a sensing device in such manner as to not interfere with the movement of the spanning brackets which support a bowed element, the arc of which is changed by the relative movement of the brackets and, in general, to provide a sensing device which is simple in construction, positive in operation and economical to manufacture.

Other objects and features of novelty of the invention will be specifically pointed out or will become apparent when referring, for a better understanding of the invention, to the following description taken in conjunction with the accompanying drawings, wherein:

FIGURE 1 is a view in elevation of a sensing device embodying features of the present invention;

FIGURE 2 is a plan view of the structure illustrated in FIGURE 1, as viewed from the right-hand side thereof;

FIGURE 3 is an enlarged sectional view of the structure illustrated in FIGURE 2, taken on the line 3—3 thereof;

FIGURE 4 is an enlarged sectional view of the structure illustrated in FIGURE 1, taken on the line 4—4 thereof;

FIGURE 5 is a sectional view of the structure illustrated in FIGURE 3, taken on the line 5—5 thereof, and FIGURE 6 is a sectional view of the structure illustrated in FIGURE 3, with parts broken away, taken on the line 6—6 thereof.

In the figures, a column 10 has a sensing device 11 secured thereto by bolts 12 in fixed nonmovable relation thereto. The device has two spaced end brackets 13 and 14 containing apertured flanges 15 through which the bolts 12 extend to secure the brackets to the column. A bowable element 16 has the enlarged ends located on the bracket by dowels 17 and secured thereto by screws 18. When the brackets 13 and 14 are moved toward each other a greater curvature will occur to the bowable element 16 and when moved away from each other the curvature of the bowable member 16 will be reduced.

The bracket 13 has a pair of side plates 21 secured thereto by screws 22. A bridging plate 23 is secured to the top of the side plates 21 by a plurality of screws 24. It will be noted in this arrangement that the end bracket 14 is not connected to the plates 21 or 23 and is therefore movable independently thereof and the end bracket 13.

The plate 23 has a cylindrical aperture 25 disposed part way through the plate from the outer face thereof in communication with a slot 26 cut into the opposite face of the plate. The outer cylindrical element 27 of the indicating device 28 is press-fitted within the aperture 25 and further supported in fixed position by the washer 29 secured thereto by bolts 32. A responsive device 33 of the indicating device is fixed to a sleeve 34 by a screw 35 and is urged outwardly of the cylindrical element 27 by a spring 36. A rotatable adjusting sleeve 37 is provided for moving the responser device 33 toward and from the bowable member 16 to change the adjustment thereof. The sleeve 37 is supported on the element 27 by a plurality of screws 38 which have pointed ends which extend within an angular slot 39 in the outer face of the element. A flanged ring 41 is secured within the rotatable indicating sleeve 37 by a plurality of screws 42. A washer 43 is secured on the flanged ring 41 by screws 40 to form a cover for the ring flush with the end of the rotatable indicating sleeve 37. A plurality of apertures 44 extend through the washer 43 and the flanged ring 41, the apertures within the ring being threaded to receive a plurality of screws 45 which are in engagement with one face of a split ring 46 on the end of the ring 41. A ball 47 is recessed in the sleeve 34 in position to abut the opposite face of the split ring 46 when urged thereagainst by the spring 36. The screws 45 are adjustable to position the split ring 46 on a varying path so that the indicia 48 on the sleeve 37 can be uniformly spaced so that each increment of advancement in rotation thereof will equal a selected unit of strain on the gauge. A helical lead of the ring would not accomplish this end and varying degrees of rotation of the rotatable indicating sleeve 37 would be necessary for equal units of strain which are to be measured. A key 49 is fixed in a slot 51 in the inner face of a cylindrical element 27 by a screw 52. The key 49 extends within a key slot 53 in the outer face of the sleeve 34 and prevents the sleeve from rotating while permitting it to move axially.

In FIGURE 3, the bowed element 16 is illustrated as being bowed to the left as viewed in the figure with the actuating button 53 in engagement therewith. A desired amount of bow is maintained in the bowable element 16 by a rod 54 which extends into apertures 55 in the brackets 13 and 14. A short dowl pin 56 extends through a tapered aperture in the bracket 13 and through the end of the rod 54 extending therein. A longer dowl pin 57 extends through the plates 21, the bracket 14 and the end of the rod 54 extending in the aperture 55 thereof. This accurately locates the brackets 13 and 14 relative to each other.

The screws 12 extend through the flanges 15 of the brackets and secure the brackets to the column or other element in firm, fixed, nonmovable relation thereto. Thereafter, the long dowl pin 57 is removed permitting the brackets 14 and 13 to move relative to each other independent of the other elements of the device except for the bowed element 16 which is fixed to the brackets. The arrangement is such that an indication will be provided upon the tensioning of the material between the brackets which are relatively moved thereby to change the bow in the bowed element 16 which will thereby move the indicating button 53 to the right. The button has a stud which extends through a spring washer 58 and is threaded to an element 59 having a head which is disposed in an aperture 61 in a hollow plug 60. The spring washer 58 is clamped to the end of the device 33 by a threaded cap 50. The plug carries a bridging disc 62 which, when the button 53 moves to the right a sufficient amount is drawn against the pole pieces 63 between which a permanent magnet 64 is mounted. This shunts the flux from the opposite end of the pole pieces on which coils 65 are mounted having leads 66 in which an E.M.F. is induced in a sufficient amount as to operate a device when properly amplified.

If a compression strain is to be measured, the bow in the bowable element 16 is produced to the right as illustrated in FIG. 3 when preset by the use of the rod 54 and the dowl pins 56 and 57. After the brackets are secured to the column or element by the bolts 12 the compression of the material between the brackets further bows the bowable element 16 to the right thereby moving the actuating button 53 to the right and when this occurs a predetermined amount, an indication will be provided by the induced E.M.F. in the coils 65 and the leads 66 in a manner as pointed out hereinabove.

What is claimed is:

1. In a strain sensing device, a pair of spaced brackets securable to an element to be gauged, an element on one of said brackets fixed thereto to be independent of said other bracket, a bowable element fixed to said brackets in bowed relation to said device, and an indicating device supported on said element in engagement with the bowed portion of the bowable element the change in bow of which actuates said device.

2. In a strain sensing device, a pair of spaced brackets securable to an element to be gauged, an element on one of said brackets fixed thereto to be independent of said other bracket, a bowable element fixed to said brackets in bowed relation to said device, an indicating device supported on said element in engagement with the bowable portion of said bowable element in position to be actuated by the change in the bow thereof, and a rod interconnecting said brackets by which a bow may be preset in the bowable element before the brackets are attached to the element, the rod being released thereafter from at least one of said brackets to permit the brackets to move relative to each other.

3. In a strain sensing device, a pair of spaced brackets securable to an element to be gauged, an element on one of said brackets fixed thereto to be independent of said other bracket, a bowable element fixed to said brackets in bowed relation to said device, an indicating device supported on said element in engagement with the bowable portion of the bowable element in position to be actuated by the change in the bow thereof, a rod interconnecting said brackets by which a bow may be preset in the bowable element before the brackets are attached to the element, and means for disconnecting said rod from one of said brackets so that it may move independently of the rod and the other bracket.

4. In a strain sensing device, a pair of spaced brackets, a bowable element interconnecting said brackets and rigidly secured thereto, indicating means carried by one of the brackets independent of said other bracket and engageable with said bowable element the change in the bow of which actuates the indicating means, and a rod interconnecting said brackets for presetting a bow in said element before said brackets are secured to the member to be gauged, the rod being released thereafter from at least one of said brackets to permit the brackets to move relative to each other.

5. In a strain sensing device, a pair of spaced brackets, a bowable element interconnecting said brackets and rigidly secured thereto, indicating means carried by one of the brackets independent of said other bracket and engagable with said bowable element the change in the bow of which actuates the indicating means, a rod interconnecting said brackets for presetting a bow in said element before said brackets are secured to the member to be gauged, and means for releasing at least one end of said rod from the bracket to which it was attached after the brackets are secured to the member to permit the brackets to relatively move independent of each other and said rod.

6. In a strain sensing device, a pair of spaced brackets having means thereon by which they are fixed to a member subject to strain, a bowable element rigidly secured to said brackets and extending therebetween, a pair of plates secured to the sides of one of said brackets and extending to the other bracket, a third plate secured to said pair of plates and extending thereacross, said third plate having an aperture extending part way therethrough and a slot on the opposite side communicating with said aperture, and an indicating device supported in said aperture with the operating element thereof extending through said slot in engagement with said bowable element whereby the movement of the brackets toward and away from each other changes the bow of said element and operates the indicating device.

7. In a strain sensing device, a pair of spaced brackets having means thereon by which they are fixed to a member subject to strain, a bowable element rigidly secured to said brackets and extending therebetween, a pair of plates secured to the sides of one of said brackets and extending to the other bracket, a third plate secured to said pair of plates and extending thereacross, said third plate having an aperture extending part way therethrough and a slot on the opposite side communicating with said aperture, an indicating device supported in said aperture with the operating element thereof extending through said slot in engagement with said bowable element whereby the movement of the brackets toward and away from each other changes the bow of said element and operates the indicating device, means interconnecting the two brackets to space them a predetermined distance apart and to preset a bow in said bowable element before the brackets are attached to the member, and means for releasing at least one of said brackets thereafter.

8. In a strain sensing device, a pair of spaced brackets securable to a member to be strained, a bowable element interconnecting said brackets, an indicating device, a member on one of said brackets for supporting said indicating device on said member having an end in engagement with said bowable element, the change in the bow of which changes the position of the bow-engaging end, and adjusting means on said device for moving the bow-engaging end inwardly and outwardly relative to said bowable element.

9. In a strain sensing device, a pair of spaced brackets securable to a member to be strained, a bowable element interconnecting said brackets, an indicating device, a member on one of said brackets for supporting said indicating device on said member having an end in engagement with said bowable element, the change in the bow of which changes the position of the bow-engaging end, and adjusting means on said device for moving the bow-engaging end inwardly and outwardly relative to said bowable element, said adjusting means having an element forming an inclined plane against which the bow-engaging end of the indicating device is urged and adjusted by the slope of the plane when the adjustable means is rotated.

10. In a strain sensing device, a pair of spaced brackets securable to a member to be strained, a bowable element interconnecting said brackets, an indicating device, a member on one of said brackets for supporting said indicating device on said member having an end in engagement with said bowable element, the change in the bow of which changes the position of the bow-engaging end, adjusting means on said device for moving the bow-engaging end inwardly and outwardly relative to said bowable element, said adjusting means having an element forming an inclined plane against which the bow-engaging end of the indicating device is urged and adjusted by the slope of the plane when the adjustable means is rotated, and means for varying the inclined plane so that equally spaced indicia on the adjusting means will conform to unit loads which are to be measured.

11. In a strain sensing device, a pair of spaced brackets having means thereon by which they are fixed to a member subject to strain, a bowable element rigidly secured to said brackets and extending therebetween, a pair of plates secured to the sides of one of said brackets and extending to the other bracket, a third plate secured to said pair of plates and extending thereacross, said third plate having an aperture extending part way therethrough and a slot on the opposite side communicating with said aperture, and an indicating device supported in said aperture with the operating element thereof extending through said slot in engagement with said bowable element whereby the movement of the brackets toward and away from each other changes the bow of said element and operates the indicating device, said indicating device producing an electro motive force to provide an indication that a maximum strain has been reached.

12. In a strain sensing device, a pair of spaced brackets having means thereon by which they are fixed to a member subject to strain, a bowable element rigidly secured to said brackets and extending therebetween, a pair of plates secured to the sides of one of said brackets and extending to the other bracket, a third plate secured to said pair of plates and extending thereacross, said third plate having an aperture extending part way therethrough and a slot on the opposite side communicating with said aperture, and an indicating device supported in said aperture with the operating element thereof extending through said slot in engagement with said bowable element whereby the movement of the brackets toward and away from each other changes the bow of said element and operates the indicating device, said indicating device producing an indication of the strain in the member located between the brackets.

References Cited by the Examiner

UNITED STATES PATENTS 2,238,234   4/41   Stansfield _____ 340—236

FOREIGN PATENTS 859,459   6/40   France.
732,232   6/55   Great Britain.

OTHER REFERENCES

German application 1,063,405, Aug. 13, 1959 (2 pages spec., 1 sheet dwg.).

RICHARD C. QUEISSER, *Primary Examiner.*